Figure 1:
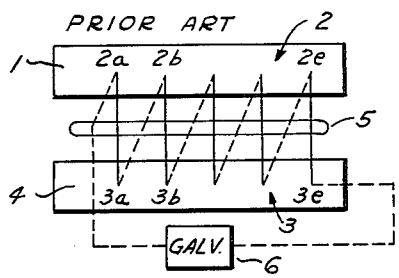

Aug. 6, 1963 T. H. BENZINGER 3,099,923
THERMOPILE SWITCHING SYSTEMS

Filed Jan. 18, 1960

INVENTOR.
THEODOR H. BENZINGER
BY

United States Patent Office 3,099,923
Patented Aug. 6, 1963

3,099,923
THERMOPILE SWITCHING SYSTEMS
Theodor H. Benzinger, Holly Oaks, Tilden Lane,
Rockville, Md.
Filed Jan. 18, 1960, Ser. No. 3,212
12 Claims. (Cl. 73—341)
(Granted under Title 35, U.S. Code (1952), sec. 266)

The invention described herein may be manufactured and used by or for the Government of the United States of America for governmental purposes without the payment of any royalties thereon or therefor.

The present invention relates generally to thermoelectric systems for determining temperature and heat flow and, more particularly, to apparatus for and methods of selectively switching multijunction thermopiles into and out of associated temperature measuring networks.

Thermocouples have long been employed to measure the difference in temperature between two points which may be closely or widely separated. In the particular case where it is desired to ascertain the absolute temperature of one of these points, the conventional practice has been to utilize a pair of thermocouples, one sensing the unknown temperature and the other a known and constant temperature. The latter thermocouple is usually called the "reference junction." If in such an arrangement the voltage outputs of the thermocouples are combined in series opposition, the differential voltage so obtained will be directly proportional to the magnitude of the unknown temperature.

In order to improve the sensitivity of the measuring operation whereby an increased output signal is available for a given difference in temperature between the above two points, the number of thermocouples or junctions at each site is multiplied so that, instead of a single junction providing the signal, one hundred such junctions usually contribute to the over-all output. Such a multiplicity of thermocouples is called a "thermopile." Inasmuch as the voltage developed from the "end thermopile," that is, the thermopile sensing the unknown temperature, must be combined in opposition with the voltage developed by the reference thermopile, the prior art has found it convenient to accomplish this by cross-connecting the individual junctions of both thermopiles in a sequential fashion. By resorting to such a wiring scheme, the electrical construction of the thermopiles is considerably simplified and at the same time the required out-of-phase signal relationship is still maintained.

In numerous laboratory experiments and industrial applications, it is oftentimes desirable to utilize a multiplicity of thermopiles built into different physical structures with a single reference thermopile and its associated temperature indicating and recording equipment. However, the substitution of such thermopiles requires complicated switching apparatus since, for example, one hundred copper-to-copper and an equal number of constantan-to-constantan connections must be interrupted. A further factor complicating the switching operation is found in the fact that the size of the individual conductors is usually kept as small as possible to minimize the thermal lag of the measuring circuit.

It is accordingly a primary object of the present invention to provide a simplified switching technique for use in thermoelectric circuits or networks.

Another object of the present invention is to facilitate the switching operation involved in connecting or disconnecting "end" multijunction thermopiles from "reference" thermopiles.

It is a still further object of the present invention to provide a system for measuring the absolute temperature at a multiplicity of sites wherein a like plurality of end-type multijunction thermopiles can cooperate sequentially with a single multijunction reference thermopile.

A yet still further object of the present invention is to provide a new and improved method for effectively disconnecting a multijunction thermopile which, for example, is sensing an unknown temperature at a first location from a similarly constructed multijunction thermopile which is sensing a known temperature at a second location.

Figure 2:
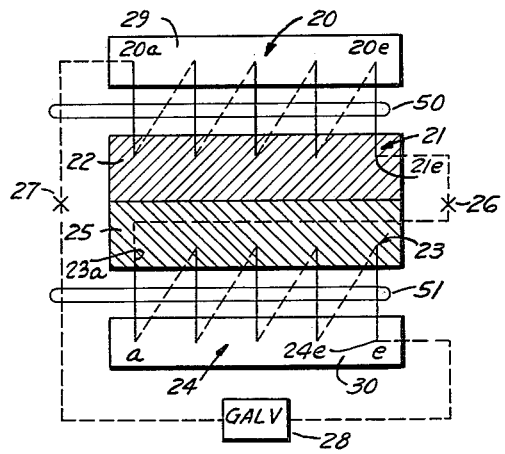
Figure 3:
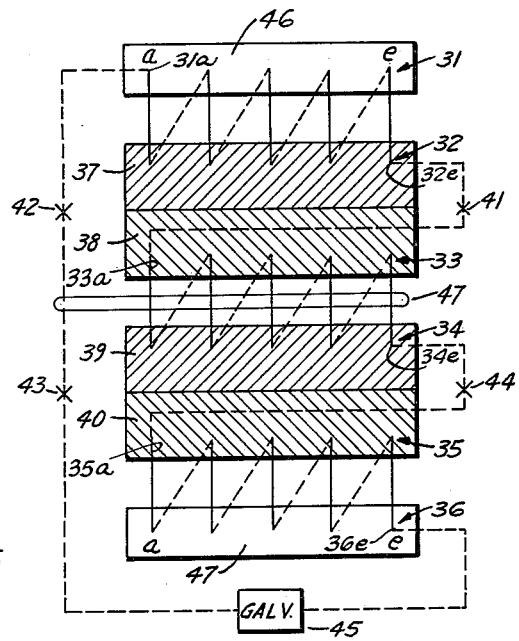
Figure 4:
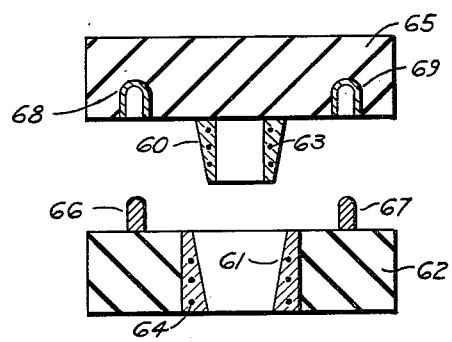

Other objects and many of the attendant advantages of this invention will be readily appreciated as the same becomes better understood by reference to the following detailed description when considered in connection with the accompanying drawings wherein:

FIG. 1 schematically illustrates the prior art arrangement whereby a pair of multijunction thermopiles are employed to determine the absolute temperature at a given location;

FIG. 2 schematically depicts one embodiment of the present invention whereby means are provided for effectively connecting and disconnecting an end thermopile from a reference thermopile;

FIG. 3 illustrates an extension of the principle shown in FIG. 2 whereby an intermediate connecting link is employed for permitting a greater degree of flexibility in the system; and FIG. 4 shows the cross-sectional details of a cooperating pair of thermal connectors which may be used in any of the latter systems.

Briefly and in general terms, the present invention simplifies the switching problem so that, instead of making and breaking the multiplicity of copper-to-copper and, for example, constantan-to-constantan connections, only two copper-to-copper connections plus one thermal connection are interrupted regardless of how many different junctions are present in each thermopile. To bring about this result, the end thermopile and the reference thermopile are each paired with a companion thermopile consisting of the same number of junctions, each pair being connected with their individual junctions in series in a manner similar to that mentioned hereinbefore. Each companion thermopile is intimately connected with optimum thermal contact to a block of metal having a high specific heat. The individual thermal junctions, of course, are electrically insulated from the metallic block. Both blocks are then brought together in a manner such that their temperatures are equalized. A series circuit is next established between all thermopiles and a voltage-sensitive detector measures the output. It can be shown that the multiplied output voltage of such an arrangement is directly proportional to the temperature difference between the unknown and the known temperatures because the voltages contributed by both companion thermopiles, being equal and opposite, cancel out and do not enter into the final reading.

Referring now to FIG. 1, there is schematically illustrated a typical prior art arrangement for determining the absolute temperature at a given location 1 by comparing it with a known and constant temperature maintained at location 4. Here, a pair of thermopiles, generally represented by reference characters 2 and 3, made up of a multiplicity of thermal junctions 2A, 2B, 3A, 3B, etc., formed, for example, from dissimilar conductors such as copper and constantan, represented for convenience's sake by the dotted and solid lines, respectively, serve as the temperature sensing pickup elements. As mentioned hereinbefore, each of these thermopiles is fabricated with a multiplicity of junctions in order to increase the sensitivity of the measuring system, that is, to increase the signal amplitude developed in the circuit for a given temperature differential between the two locations. It has been found that the simplest construction is to run a length of cable 5 containing a given number of copper and constantan conductors, depending upon the number of junctions desired between the two locations, and interconnect the terminal ends of the dissimilar conductors in the manner shown in FIG. 1. This gives a series circuit in which the voltages developed at successive thermal junctions, for example, 2A and 3A and 2B and 3B, are oppositely polarized. The differential voltage resulting from this wiring arrangement is applied to a voltage-sensitive detector such as galvanometer 6. With the temperature at location 4 known, this galvanometer can be calibrated to read the absolute temperature of location 1 directly.

From an inspection of FIG. 1 it will be seen that in order to disconnect end thermopile 2 from reference thermopile 3, five copper-to-copper and five constantan-to-constantan conductors must be interrupted. In practice, where each thermopile may consist of a hundred thermal junctions, the difficulty of providing the necessary switching sequence is all too obvious.

FIG. 2 illustrates one practical application of the present invention which requires only the interruption of two conducting circuits, both of copper, and one thermal circuit for effectively isolating an end thermopile 20 sensing the temperature at location 29 from a reference thermopile 24 sensing the known and constant temperature at location 30. In this system each of the above thermopiles is paired with a companion thermopile 21 and 23 having an equal number of thermal junctions. These companion thermopiles are embedded, cemented or otherwise connected to a pair of metallic blocks 22 and 25 made up of a material having a high thermal conductivity and high specific heat in such a way that they are at the same time in intimate thermal contact with these blocks but electrically insulated therefrom. To accomplish the electrical isolation, each of the junctions can be coated with plastic or housed within a plastic insulating tubular member of high tensile strength. If the metallic blocks are of aluminum, then those surfaces of each block which surround each junction can be anodized to further avoid any shortcircuiting of the various thermal junctions of each thermopile.

The wiring procedure for interconnecting the end thermopile 20 and the reference thermopile 24 with their companion thermopiles 21 and 23 is the same as that shown in FIG. 1, with cables 50 and 51 performing the same function as cable 5. Additionally, copper connections are made between the last thermal junction 21E of thermopile 21 and the first thermal junction 23A of thermopile 23 and from the first thermal punction 20A of thermopile 20 to the last thermal junction 24E of thermopile 24 to opposite sides of galvanometer 28. Conventional switching or disconnect devices 26 and 27 are disposed in these last two lines. The circuit is completed by bringing blocks 22 and 25 into intimate thermal contact and isolating them thermally from their environment, an operation which is performed to equalize the temperatures of both blocks.

From an examination of the electrical series circuit thus formed, it will be appreciated that the voltages developed by thermopile 20 are in opposition to those developed by companion thermopile 21, that these voltages are likewise in opposition to those developed by thermopile 23, and finally, that these last-mentioned voltages are likewise in opposition to those produced by reference thermopile 24. It will also be appreciated that, since metallic blocks 22 and 25 are similarly constructed, have the same mass and are in intimate thermal contact, their associated thermopiles 21 and 23, sensing the same temperature, will generate equal voltages and that these voltages will offset each other in the series circuit so that galvanometer 28 will indicate a voltage level representing only the difference between the signals produced by end thermopile 20 and reference thermopile 24.

It would be mentioned at this point that the absolute temperature of blocks 22 and 25 is of no importance, provided, of course, that, as mentioned hereinbefore, both blocks are maintained at the same temperature level. Therefore, if convenient, these blocks preferably should be disposed within a common insulating enclosure.

If it is desired to disconnect end thermopile 20 from the system and replace it with a different temperature-sensitive pickup network, then switches 26 and 27 can be opened and blocks 22 and 25 separated. Thus, the switching operation resolves itself into one of interrupting only two copper lines, namely, the one between thermal junction 20A and one side of the galvanometer and the other between thermal junction 21E and thermal junction 23A. Unlike the prior art, for the same number of thermal junctions, ten conductors had to be broken.

FIG. 3 illustrates an embodiment of the present invention wherein a single or multiple number of cables of uniform length may be joined together to bridge the distance between a remote end thermopile 31 and a reference thermopile 36 where circumstances do not readily permit the metallic blocks 37 and 40 to be brought into intimate thermal contact. In this modification, blocks 37 and 40 and thermopiles 32 and 35 are counterparts of blocks 22 and 25 and thermopiles 21 and 23 of FIG. 2. Since it has been assumed that it is inconvenient or otherwise difficult to bring blocks 37 and 40 together, a second pair of blocks 8 and 39 having affiliated thermopiles 33 and 34, interconnected by a length of cable 47, provides the necessary electrical and thermal link. The wiring schedule used in FIG. 2 is again followed in principle and a series circuit containing all of the thermopiles is formed by establishing a copper connection from junction 32E of thermopile 32 to junction 33A of thermopile 33 with a switching device 41 included therein; a copper connection from thermal junction 34E of thermopile 34 to thermal junction 35A of thermopile 35 with a switching device 44 included therein; a copper connection from junction 36E of thermopile 36 to one side of galvanometer 45; and an extended copper connection from thermal junction 31A via switches 42 and 43 to the other side of the galvanometer. From an inspection of the complete circuit resulting from these connections it will be apparent that the voltage developed by thermopile 32 opposes that developed by the thermopile 33, while that developed by thermopile 34 opposes that generated by thermopile 35. Consequently, the only voltages left in effect in the system are those produced by the end thermopile 31 and the reference thermopile 36, which is in accordance with the desired objective. Hence, galvanometer 45 will again record a voltage level proportional to the differential voltage of these two thermopiles. Again, from an operational standpoint, blocks 37 and 38 must be at the same temperature, and the same holds true with respect to blocks 39 and 40. However, it will be pointed out that each pair of blocks can be at a different absolute temperature without any error entering into the measuring operation. It is, of course, mandatory that the number of thermocouples be identical in every component of the system.

To disassemble the network shown in FIG. 3 so as to permit the substitution of a different type of end thermopile or the inclusion of an additional length of cable similar to cable 47, switches 41, 42, 43 and 44 can be opened and the various companion blocks separated.

From the above description, it should be appreciated that any type of network can be built up following the procedures illustrated in FIGS. 2 and 3, the only electrical requirement being that the signals derived from the thermopiles embedded in contacting metallic blocks be combined in series opposition wherever they occur. If this is adhered to, then the voltages developed by all thermopiles except the end and the reference thermopiles will never enter into the final reading.

If the individual thermopiles of FIG. 3 are assigned different letters of the alphabet, such as $a$, $b$, $c$, $d$, $e$ and $f$, and the number of their thermal junctions identified as $a_n$, $b_n$, $c_m$, $d_m$, $e_n$ and $f_n$, then the electrical sequence employed in connecting these thermal junctions can be generally described by the following series $a_1$, $b_1$, $a_2$, $b_2$ ... $a_n$, $b_n$, $c_1$, $d_1$, $c_2$, $d_2$ ... $c_m$, $d_m$, $e_1$, $f_1$, $e_2$, $f_2$ ... $e_n$, $f_n$. In the above arrangement, thermopile $a$ senses the unknown temperature, thermopiles $b$ and $c$ the same temperature, thermopiles $d$ and $e$ the same temperature and thermopile $f$ the known and constant temperature. It will be appreciated that thermopiles $a$ and $b$ and $e$ and $f$ must have the same number of thermal junctions since the voltages developed by $a$ and $f$ react to determine the final output signal. However, while thermopiles $c$ and $d$ must have the same number of thermal junctions, this number need not be equal to the number of thermal junctions in the other thermopiles, the reason for this being that the voltages developed by thermopiles $c$ and $d$ cancel out and never influence the final reading. This explains why the total number of thermal junctions of, for example, thermopiles $a$ and $b$ are expressed as $a_n$ and $b_n$ while those of $c$ and $d$ are $c_m$ and $d_m$.

In the above descriptions the various metallic blocks 22, 25, 37, 38, etc., were, for convenience's sake, in the simplified form of rectangular metallic blocks. In actual practice a cooperating pair of such blocks can take the configuration shown in FIG. 4. Thus, in the modification of FIG. 3, jumper cable 47 would terminate at one end in a male connector similar to 60 and at the other end in a female connector similar to 61, both having a self-holding taper. The thermal junctions would be embedded in the walls of these connectors with suitable electric insulation provided to avoid shorting. Typical junctions are identified by reference characters 63 and 64. For simplifying the connecting and disconnecting of these connectors, both components could be mounted or otherwise permanently secured to bushings 62 and 65 constructed of thermally nonconducting material. To further facilitate the assembly of the network, the male connectors 66, 67 and the female connectors 68, 69 of disconnect switches 43 and 44, for example, could also be built into these bushings, an arrangement which would permit both the electrical and thermal circuits to be open or closed simultaneously.

Obviously many modifications and variations of the present invention are possible in the light of the above teachings. It is therefore to be understood that within the scope of the appended claims the invention may be practiced otherwise than as specifically described.

What is claimed is:

1. A switching arrangement for thermopiles comprising, in combination, first, second, third and fourth thermopiles, each of said thermopiles having the same type and number of thermal junctions, with the junctions of said first thermopile sensing an unknown temperature, the junctions of said second thermopile sensing the temperature of a first metallic member, the junctions of said third thermopile sensing the temperature of a second metallic member and the junctions of said fourth thermopile sensing a known and constant temperature, means for connecting the individual thermal junctions of said first and second thermopile in a first series circuit such that the voltages developed at successive thermal junctions of said series circuit are oppositely polarized, means for connecting the individual thermal junctions of said third and fourth thermopiles in a second series circuit such that the voltages developed at successive thermal junctions of said second series circuit are oppositely polarized, means for connecting said first and second series circuit in a third series network such that the voltages developed at the junctions of said second thermopile oppose the voltages developed at the junctions of said third thermopile, and means for measuring the output of said third series network when said first and second metallic members are brought into thermal contact with each other and their respective temperatures equalized.

2. A switching arrangement for thermoelectric systems comprising, in combination, a first length of cable having $n$ conductors made of a first metal and $n$ conductors made of a second dissimilar metal, means for connecting the conductors at each end of said cable together in such a manner that $n$ thermal junctions are formed at each end of said cable with all of said thermal junctions being in a first series circuit, alternate thermal junctions of said series consisting of different thermal junctions from the same end of said cable and the voltages developed at successive junctions of said first series circuit being oppositely polarized, a second length of cable, said second length of cable having the same number and type of conductors as said first cable, the conductors of said second cable being connected together in the same manner as the conductors of said first cable whereby a second series circuit is formed, the thermal junctions at one end of said first cable sensing an unknown temperature, a first metallic member, the thermal junctions at the other end of said first cable sensing the temperature of said first metallic member, a second metallic member, the thermal junctions at one end of said second cable sensing a known and constant temperature and the thermal junctions at the other end of said second cable sensing the temperature of said second metallic member, means for connecting said first and second series circuits in a third series circuit such that the voltages developed by those thermal junctions of said first cable which sense the temperature of said first metallic member and the voltages developed by those junctions of said second cable which sense the temperature of said second metallic member are in opposition, means for measuring the output voltage of said third series circuit, and means for establishing thermal contact between said first and second metallic members whereby the output voltage is equal to the difference between the voltages generated by the junctions of said first cable sensing said unknown temperature and the junctions of said second cable sensing said known and constant temperature.

3. For use in a temperature measuring circuit wherein an end thermopile senses an unknown temperature and a reference thermopile senses a known and constant temperature, the subcombination of first, second, third and fourth metallic members, a thermopile $a$ having $a_n$ thermal junctions sensing the temperature of said first metallic member, a thermopile $b$ having $b_m$ thermal junctions sensing the temperature of said second metallic member, a thermopile $c$ having $c_m$ thermal junctions sensing the temperature of said third member, and a thermopile $d$ having $d_n$ thermal junctions sensing the temperature of said fourth metallic member, means for connecting the individual thermal junctions of thermopiles $b$ and $c$ in a series sequence $b_1$, $c_1$, $b_2$, $c_2$ ... $b_m$, $c_m$, with the voltages developed at alternate junctions of said series being of the same polarity, and means for establishing thermal contact between said first and second metallic members and said third and fourth metallic members whereby the voltages developed by thermopiles $a$ and $b$ are equal and the voltages developed by thermopiles $c$ and $d$ are equal.

4. In a temperature measuring system, a multiplicity of similarly constructed thermopiles $a$, $b$, $c$, $d$ having $a_n$, $b_n$, $c_n$ and $d_n$ thermal junctions, means for connecting the individual thermal junctions of said thermopile in series in accordance with the sequence $a_1$, $b_1$, $a_2$, $b_2$ ... $a_n$, $b_n$, $c_1$, $d_1$, $c_2$, $d_2$ ... $c_n$, $d_n$, with the voltages developed at successive thermal junctions of said series being oppositely polarized, first and second metallic members, means for maintaining the individual junctions of thermopile $b$ in thermal contact with but electrically insulated from said first metallic member and the individual junctions of thermopile $c$ in thermal contact with but electrically insulated from said second metallic member, means for maintaining said first and second metallic members in thermal contact with each other thereby to equalize their temperatures and means for providing an indication of the magnitude of the output voltage of said series circuits when thermopile $a$ senses an unknown temperature and thermopile $d$ senses a known and constant temperature.

5. In an arrangement as defined in claim 4 wherein said first and second metallic members are in the form of mating connectors.

6. In an arrangement as defined in claim 4 wherein a circuit interrupting device is inserted between thermal junctions $b_n$ and $c_1$.

7. In an arrangement as defined in claim 4 wherein means for providing an indication of the magnitude of the output voltage of said series sequence comprises a galvanometer having one terminal thereof connected to thermal junction $a_1$ and the other terminal thereof connected to $d_n$.

8. In combination, first, second, third and fourth thermopiles, each of said thermopiles having the same type and number of thermal junctions, the individual thermal junctions of said first thermopile sensing an unknown temperature, the individual thermal junctions of said second thermopile sensing the temperature of a first metallic member, the individual thermal junctions of said third thermopile sensing the temperature of a second metallic member, the individual thermal junctions of said fourth thermopile sensing a known and substantially constant temperature, means for interconnecting said first, second, third and fourth thermopiles in a series circuit such that the voltages developed by said first thermopile oppose those developed by said second thermopile, the voltages developed by said second thermopile oppose those developed by said third thermopile, the voltages developed by said third thermopile oppose those developed by said fourth thermopile, and means for maintaining said first and second metallic members in thermal contact whereby the individual thermal junctions of said second and third thermopiles sense substantially the same temperature and whereby the output voltage of said series circuit is equal to the difference of the voltages developed by said first and fourth thermopiles, and means for providing an indication of the magnitude of said output voltage.

9. In combination, a first series of $a_n$ thermojunctions, a second series of $b_n$ thermojunctions, a third series of $c_n$ thermojunctions and a fourth series of $d_n$ thermojunctions, means for connecting the individual thermojunctions of these series in the following sequence, $a_1, b_1, a_2, b_2 \ldots a_n, b_n, c_1, d_1, c_2, d_2 \ldots c_n, d_n$, a first and second member, each member being made of a material having a high specific heat, means for maintaining said second series of $b_n$ and said third series of $c_n$ thermojunctions in thermal contact with said first and second members, respectively, and means for providing an indication of the magnitude of the voltage developed by said sequence of thermojunctions when said first series of $a_n$ thermojunctions is exposed to an unknown temperature, said fourth series of $d_n$ thermojunctions is exposed to a known and constant temperature, and when thermal contact is established between said first and second members.

10. In an arrangement as defined in claim 9 wherein said first and second members take the form of mating connectors.

11. In combination a first series of $a_n$ thermojunctions, a second series of $b_n$ thermojunctions, a third series of $c_m$ thermojunctions, a fourth series of $d_m$ thermojunctions, a fifth series of $e_n$ thermojunctions and a sixth series of $f_n$ thermojunctions, means for connecting the individual thermojunctions of these series in the following sequence $a_1, b_1, a_2, b_2 \ldots a_n, b_n, c_1, d_1, c_2, d_2 \ldots c_m, d_m, e_1, f_1, e_2, f_2 \ldots e_n, f_n$, with the voltages developed at successive junctions of said sequence being oppositely polarized, means for maintaining the second series of $b_n$ and the third series of $c_m$ thermojunctions at the same temperature, said means for maintaining the second series of $b_n$ and the third series of $c_m$ thermojunctions at the same temperature comprising first and second members made of a material having a high specific heat, said second series of $b_n$ thermojunctions being in thermal contact with said first member, said third series of $c_m$ thermojunctions being in thermal contact with said second member and means for establishing thermal contact between said first and second members, means for maintaining the fourth series of $d_m$ and the fifth series of $e_n$ thermojunctions at the same temperature, and means for indicating the magnitude of the voltage developed by said sequence of thermojunctions when the first series of $a_n$ thermojunctions is exposed to an unknown temperature and the sixth series of $f_n$ thermojunctions is exposed to a known and constant temperature.

12. In an arrangement as defined in claim 11 wherein said means for maintaining the fourth series of $d_m$ thermojunctions and the fifth series of $e_n$ thermojunctions at the same temperature comprises third and fourth members made of a material having a high specific heat, said fourth series of $d_m$ thermojunctions being in thermal contact with said third member and said fifth series of $e_n$ thermojunctions being in thermal contact with said fourth member, and means for establishing thermal contact between said third and fourth members.

References Cited in the file of this patent
UNITED STATES PATENTS

| | | |
|---|---|---|
| 1,103,640 | Wilson | July 14, 1914 |
| 1,942,516 | Noyes | Jan. 9, 1934 |
| 2,312,022 | Brooks | Feb. 23, 1943 |
| 2,473,627 | Wickizer | June 21, 1949 |
| 2,475,238 | Hall et al. | July 5, 1949 |
| 2,690,076 | Hovanian | Sept. 28, 1954 |